UNITED STATES PATENT OFFICE.

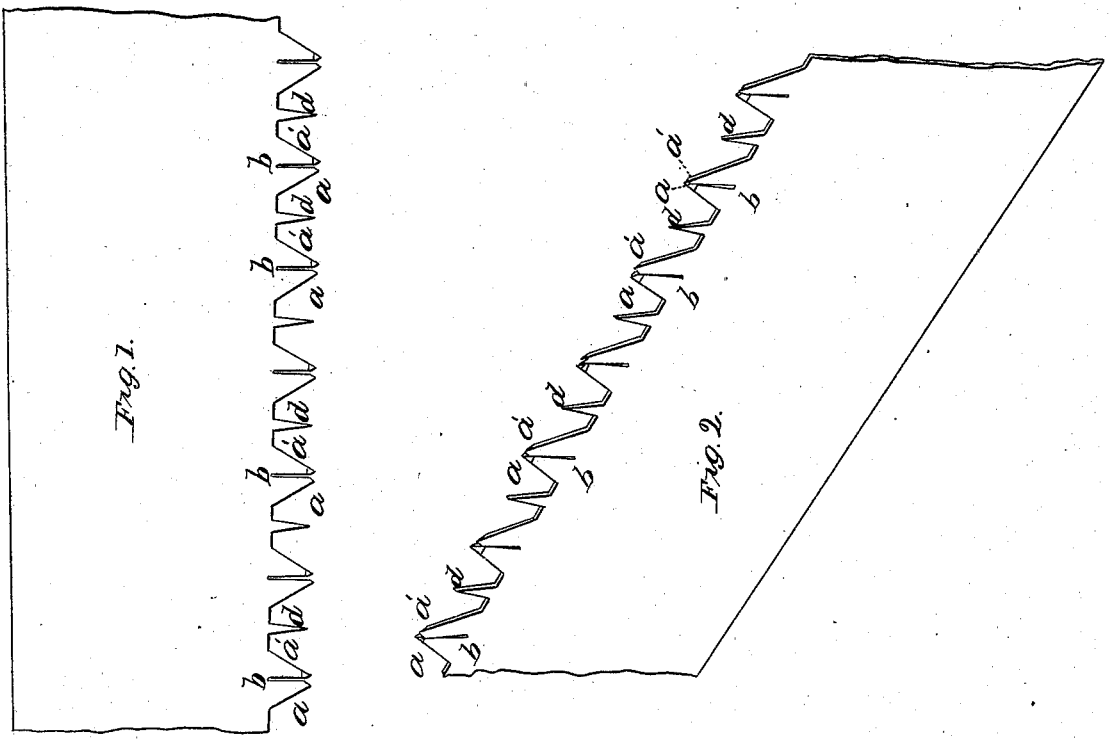

WILLIAM G. TUTTLE, OF GENEVA, NEW YORK.

IMPROVEMENT IN SAWS.

Specification forming part of Letters Patent No. 37,312, dated January 6, 1863.

*To all whom it may concern:*

Be it known that I, WILLIAM G. TUTTLE, of Geneva, in the county of Ontario and State of New York, have invented a new and useful Improvement in Saws; and I do hereby declare that the following is a full and exact description thereof, reference being had to the accompanying drawings, making part of this specification.

Figure 1 is a side view of a fragment of a reciprocating saw with my improvement; Fig. 2, a perspective view of the same.

Like letters designate corresponding parts in both figures.

My improvement relates to that class of saws where the cutting "fleam" or "set" teeth are situated in pairs, which alternate with intermediate clearing-teeth for removing the dust from the kerf and for cutting down the middle of the same; and the invention consists in the peculiar form and arrangement of the teeth of a single saw-blade, whereby the instrument is made more effective in operation, the dust is removed from the kerf more readily, the teeth are more easily and expeditiously sharpened, and economy of space on the blade is secured without lessening the size of said teeth; or, in other words, a greater number of teeth of the ordinary size are situated in the same longitudinal space than usual, thus increasing the cutting capacity of the saw.

In the ordinary device, for the purpose referred to, the cutting or set teeth are made of the usual pointed or triangular form, with an open notch or space between them, thereby separating them considerably. Thus these points, which are set in opposite directions, and form, respectively, the opposite sides of the kerf, must cut the wood, one in advance of the other, at such a distance apart that they will not counterbalance in action but will work irregularly. Instead of this arrangement, I make each pair of the cutting-teeth *a* and *a'*, combined, in the usual triangular pointed form of a single, ordinary tooth, but a little larger to give sufficient strength, and with a narrow central slit or opening, *b'*, between them, extending from point to base, as represented. The points of these teeth are thus situated closely together nearly opposite each other laterally. They are set, respectively, in opposite directions, and their points filed from the inside to a sharp edge and also notched slightly in the apex. In the ordinary arrangement also the plane or clearing teeth intermediate with the pairs of cutting-teeth are made of hook form, and are usually two in number where only a single saw-blade is used pointing, respectively, in opposite directions, their purpose being not only to remove the dust from the kerf, but also to plane down the middle of the channel, as it is scored on each side by the cutting-teeth, and also to serve as a gage. Instead of these double hook-teeth I employ a single straight clearing-tooth, *d*, occupying an intermediate position, and substantially of the shape represented in the drawings. These teeth are made a little shorter than the cutting-teeth to protect them from contact with the uncut wood, and may be blunt or obtuse at the point, as their office is alone to clear the kerf from dust. The teeth thus arranged cut the kerf easily and rapidly without binding, and but a single saw-blade is used, a device much simpler and cheaper, as well as more effective, than where two or more blades are employed side by side. The points of the pairs of cutting-teeth *a a'*, by being situated closely together and nearly opposite, counterbalance each other laterally in cutting and allow the saw to work easily and regularly, which is not the case where the points are situated at considerable distance apart, the isolated teeth in such case springing inward in the open kerf against the set when passing through a knot or other hard portion of the wood, having no counter-resistance to equalize the action, and thus making the channel at that point narrower than usual, so that the blade will bind. Also, in sawing with the grain, if the points of the teeth are situated at considerable distance apart, they are liable to only divide the fiber on each side of the kerf, the fiber yielding laterally of the teeth, thus leaving it in long shreds, which can be only removed by planing away by the intermediate hook-teeth. The points of my cutting-teeth, by being situated closely together, thus cutting nearly opposite each other, do not allow the fiber to spring away from the teeth, but cut it up into fine dust, which is easily removed by the straight clearing-teeth *d d*. In this respect, as the office of these teeth is only to clear the kerf and not to cut it, they can be made straight and blunt-pointed, and but a single one used between the pairs of cutting-teeth, thus occupying the smallest space.

In addition to the advantage of thus having the points of the teeth close together to cut the kerf easily and truly, they are arranged on the blade in the most compact and efficient manner possible to secure the desired result, there being no unoccupied space on the saw. I am thus enabled to use nearly double the number of teeth of the same size on the same length of space than usual. In the ordinary form and arrangement of the teeth, if the same number were used they would either have to be made smaller or the length of the saw increased, on account of the great space unavoidable between the said teeth.

While thus arranging my teeth so that they are more compact, I at the same time provide for the perfect removal of the dust from the kerf, so that the cutting capacity of the saw is in proportion to the number of teeth used, without increasing the length of the blade. I am also enabled to file or sharpen the teeth of my saw with greater facility and expedition than in any arrangement for similar purposes, as the filing-surface is much less and the edges of the teeth are all plane and regular. The pairs of cutting-teeth $c\ c'$ are filed with but little more labor than the ordinary single triangular tooth, since there are but two sides with the straight narrow slit $b$ between, which only requires lengthening occasionally; and the single straight clearing-teeth $d\ d$ do not require filing at all, except to preserve their relative position as regards length with the cutting-teeth.

I do not claim, broadly, the use of alternate pairs of cutting-teeth with intermediate plane teeth, as I am aware that such, with the points situated at considerable distance apart, have been used before; but

What I claim as my invention, and desire to secure by Letters Patent, is—

The use of alternate triangular pairs of cutting-teeth $a\ a'$, separated individually by the narrow slit $b$, and with their points resting closely together, in combination with the intermediate single straight clearing-teeth $d$, the whole arranged on a single saw-blade, and operating substantially as and for the purposes herein set forth.

In witness whereof I have hereunto signed my name in the presence of two subscribing witnesses.

W. G. TUTTLE.

Witnesses:
J. FRASER,
J. L. RE QUA.